US009559622B2

(12) United States Patent
Fujimura et al.

(10) Patent No.: US 9,559,622 B2
(45) Date of Patent: Jan. 31, 2017

(54) MOTOR DRIVING DEVICE, ELECTRONIC APPLIANCE, AND VEHICLE

(71) Applicant: Rohm Co., Ltd., Kyoto (JP)

(72) Inventors: Takashi Fujimura, Kyoto (JP); Hirofumi Yuki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 70 days.

(21) Appl. No.: 14/060,850

(22) Filed: Oct. 23, 2013

(65) Prior Publication Data
US 2014/0117889 A1    May 1, 2014

(30) Foreign Application Priority Data

Oct. 25, 2012 (JP) ................................ 2012-235808

(51) Int. Cl.
*H02P 6/18* (2016.01)
(52) U.S. Cl.
CPC ................. *H02P 6/18* (2013.01); *H02P 6/182* (2013.01); *H02P 6/187* (2013.01)
(58) Field of Classification Search
CPC .............. H02P 6/18; H02P 6/182; H02P 6/187
USPC ............ 318/400.34, 400.06, 400.03, 400.01; 363/41
See application file for complete search history.

(56) References Cited

U.S. PATENT DOCUMENTS

| 4,642,537 A | 2/1987 | Young |
| 4,859,921 A | 8/1989 | Archer |
| 5,640,073 A | 6/1997 | Ikeda |
| 8,970,150 B2 * | 3/2015 | Boscolo ................ H02P 6/185 318/400.31 |
| 2003/0001531 A1 * | 1/2003 | Xi ........................ H02P 6/002 318/400.22 |
| 2003/0141833 A1 | 7/2003 | Heidrich |
| 2004/0080293 A1 | 4/2004 | Kurosawa et al. |
| 2008/0036407 A1 * | 2/2008 | Okui ...................... H02P 7/28 318/434 |

(Continued)

FOREIGN PATENT DOCUMENTS

| JP | 2004-140975 A | 5/2004 |
| JP | 2004-516800 A | 6/2004 |

(Continued)

OTHER PUBLICATIONS

Japanese Patent Office, Communication mailed Jun. 21, 2016 for Japanese Patent Application No. 2012-235808 (with English-language machine translation).

*Primary Examiner* — Shawki S Ismail
*Assistant Examiner* — Muhammad S Islam
(74) *Attorney, Agent, or Firm* — Fish & Richardson P.C.

(57) ABSTRACT

A motor driving device of the present invention includes: a driver that receives supply of a power supply voltage to apply a plurality of phase voltages to a motor; a voltage-division phase voltage generation portion that divides each of the phase voltages to generate a plurality of voltage-division phase voltages; a neutral point voltage generation portion that combines and divides the phase voltages to generate a neutral point voltage; a selector that outputs any one of the voltage-division phase voltages as a selection voltage-division phase voltage; a comparator that compares the selection voltage-division phase voltage and the neutral point voltage to generate a comparison signal; and a controller that generates a selection control signal of the selector and an energization control signal of the driver according to the comparison signal.

12 Claims, 8 Drawing Sheets

(56) References Cited

U.S. PATENT DOCUMENTS

2013/0207580 A1\* 8/2013 Uang .................. H02P 6/205
  318/400.06
2014/0145661 A1  5/2014 Chew et al.

FOREIGN PATENT DOCUMENTS

JP  2008-193812  8/2008
JP  2012-080690  4/2012

\* cited by examiner

MOTOR DRIVING DEVICE, ELECTRONIC APPLIANCE, AND VEHICLE

CROSS-REFERENCE TO RELATED APPLICATIONS

This application is based on Japanese Patent Application No. 2012-235808 filed in Japan on Oct. 25, 2012, the contents of which are hereby incorporated by reference.

BACKGROUND OF THE INVENTION

1. Field of the Invention

The present invention relates to a motor driving device and an electronic appliance and a vehicle using such a motor driving device.

2. Description of the Related Art

FIG. 8 is a block diagram showing a conventional example of a motor driving device. The motor driving device 100 of the present conventional example is a semiconductor device that drives a motor 200 through a high-voltage resistant driver 300. In the motor driving device 100, an external resistor 400 is used to generate, from phase voltages U, V and W, voltage-division phase voltages VU, VV and VW and a neutral point voltage Vref, then small low-voltage resistant comparators 110U, 110V and 110W with small variations in offset are used to compare the voltage-division phase voltages VU, VV and VW and the neutral point voltage Vref for each phase and thus the rotational position of a rotor is detected from the back electromotive force of the motor 200 without use of a sensor.

Examples of the conventional technology related to what has been described above includes JP-A-2012-80690 and JP-A-2008-193812.

However, in the motor driving device 100 of the conventional example described above, since the three comparators 110U, 110V and 110W are used as a means for comparing the voltage-division phase voltages VU, VV and VW and the neutral point voltage Vref, the size of the motor driving device 100 is increased and hence its cost is increased.

Moreover, in the motor driving device 100, since the external resistor 400 is used as a means for generating, from the phase voltages U, V and W of the motor 200, the voltage-division phase voltages VU, VV and VW and the neutral point voltage Vref, the number of components is increased and hence its cost is increased.

In the motor driving device 100, the phase voltages U, V and W are divided with reference to a ground voltage GND. Since in the external resistor 400, there are relatively small variations in resistance value, the accuracy of detection is unlikely to be reduced; however, as described above, disadvantageously, the number of components is increased and hence its cost is increased. On the other hand, although when the external resistor 400 is integrated into a semiconductor device, the number of components is reduced and hence its cost can be decreased, since there are large variations in resistance value as compared with the external resistor 400, the accuracy of detection is disadvantageously lowered significantly.

SUMMARY OF THE INVENTION

In view of the foregoing problems found by the inventors of the present application, an object of the present invention is to provide a motor driving device that can realize low cost and high accuracy and an electronic appliance and a vehicle using such a motor driving device.

To achieve the above object, according to the present invention, there is provided a motor driving device including: a driver that receives supply of a power supply voltage to apply a plurality of phase voltages to a motor; a voltage-division phase voltage generation portion that divides each of the phase voltages to generate a plurality of voltage-division phase voltages; a neutral point voltage generation portion that combines and divides the phase voltages to generate a neutral point voltage; a selector that outputs any one of the voltage-division phase voltages as a selection voltage-division phase voltage; a comparator that compares the selection voltage-division phase voltage and the neutral point voltage to generate a comparison signal; and a controller that generates a selection control signal of the selector and an energization control signal of the driver according to the comparison signal.

The other features, elements, steps, advantages and characteristics of the present invention will become obvious from the detailed description of the following preferred embodiments and the accompanying drawings related thereto.

DETAILED DESCRIPTION OF THE PREFERRED EMBODIMENTS

<First Embodiment>

Figure 1:
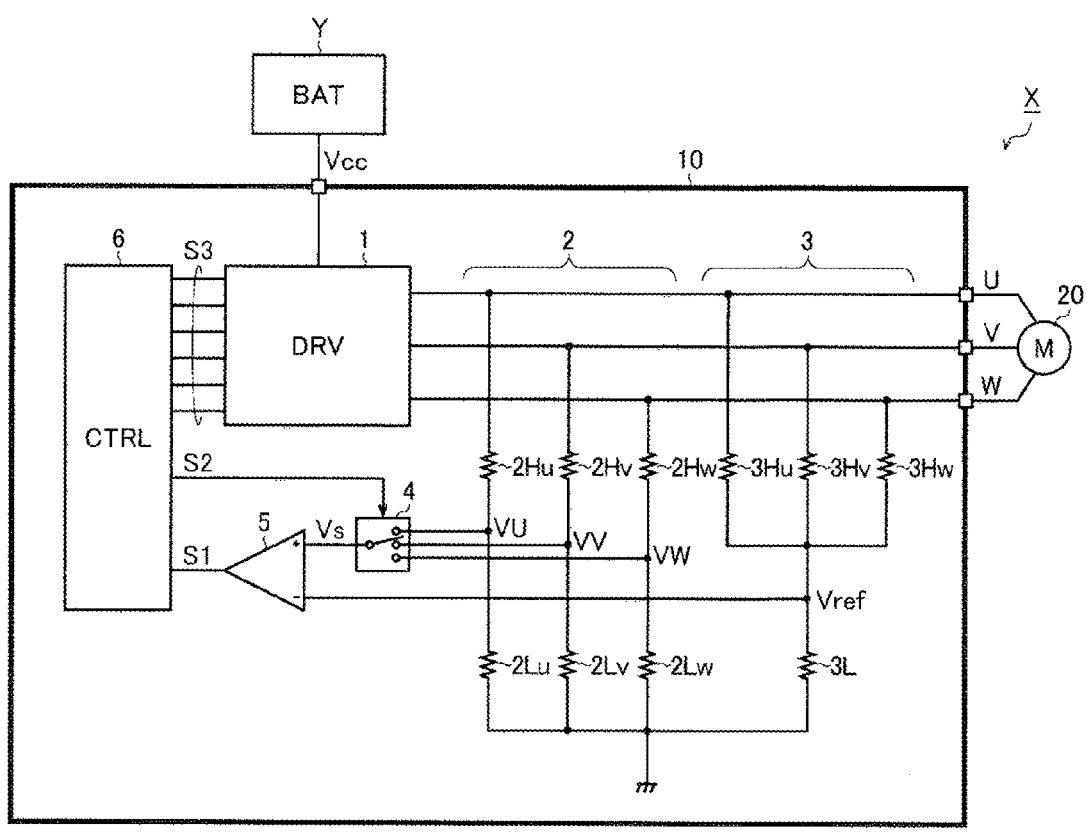
FIG. 1 A block diagram showing a first embodiment of a motor driving device.

FIG. 1 is a block diagram showing a first embodiment of a motor driving device. The motor driving device 10 of the first embodiment is a monolithic semiconductor integrated circuit device (so-called vehicle-mounted motor driver IC) that is incorporated into a vehicle-mounted electronic appliance X together with a three-phase brushless motor 20 (hereinafter simply and shortly referred to as a motor 20), and includes a driver 1, a voltage-division phase voltage generation portion 2, a neutral point voltage generation portion 3, a selector 4, a comparator 5 and a controller 6.

The driver 1 is a circuit that operates by receiving a power supply voltage Vcc (for example, 12 V) from a battery Y, and applies phase voltages U, V and W to the motor 20 according to an energization control signal S3.

The voltage-division phase voltage generation portion 2 includes resistors 2Hu, 2Hv and 2Hw (corresponding to first resistors) and resistors 2Lu, 2Lv and 2Lw (corresponding to second resistors) that are integrated into the motor driving device 10, and separates the phase voltages U, V and W to generate voltage-division phase voltages VU, VV and VW. The first ends of the resistors 2Hu, 2Hv and 2Hw are respectively connected to the application ends of the phase voltages U, V and W. The second ends of the resistors 2Hu, 2Hv and 2Hw are respectively connected to the application ends of the voltage-division phase voltages VU, VV and VW. The first ends of the resistors 2Lu, 2Lv and 2Lw are respectively connected to the application ends of the voltage-division phase voltages VU, VV and VW. The second ends of the resistors 2Lu, 2Lv and 2Lw are connected together to the application end of a reference voltage (in the present embodiment, a ground voltage GND).

The neutral point voltage generation portion 3 includes resistors 3Hu, 3Hv and 3Hw (corresponding to third resistors) and a resistor 3L (corresponding to a fourth resistor) that are integrated into the motor driving device 10, and combines and separates the phase voltages U, V and W to generate an imaginary neutral point voltage Vref. The first ends of the resistors 3Hu, 3Hv and 3Hw are respectively connected to the application ends of the phase voltages U, V and W. The second ends of the resistors 3Hu, 3Hv and 3Hw are connected together to the application end of the neutral point voltage Vref. The first end of the resistor 3L is connected to the application end of the neutral point voltage Vref. The second end of the resistor 3L is connected to the application end of the reference voltage (in the first embodiment, the ground voltage GND).

The resistance values of the first to fourth resistors described above are set such that a voltage division ratio in the voltage-division phase voltage generation portion 2 and a voltage division ratio in the neutral point voltage generation portion 3 are equal to each other. More specifically, the resistance values of the resistors 2Hu, 2Hv and 2Hw and the resistors 3Hu, 3Hv and 3Hw are set at R1, the resistance values of the resistors 2Lu, 2Lv and 2Lw are set at R2 and the resistance value of a resistor 4L is set at one third of the R2. With the setting described above, it is possible to appropriately compare the voltage-division phase voltages VU, VV and VW and the neutral point voltage Vref.

The selector 4 selects any one of the voltage-division phase voltages VU, VV and VW according to a selection control signal S2 to output it as a selection voltage-division phase voltage Vs.

The comparator 5 compares the selection voltage-division phase voltage Vs applied to a non-inverting input end (+) and the neutral point voltage Vref applied to an inverting input end (−), and thereby generates a comparison signal S1. When the selection voltage-division phase voltage Vs is higher than the neutral point voltage Vref, the comparison signal S1 is high whereas when the selection voltage-division phase voltage Vs is lower than the neutral point voltage Vref, the comparison signal S1 is low.

The controller 6 generates the selection control signal S2 of the selector 4 and the energization control signal S3 of the driver 1 according to the comparison signal S1.

As described above, the motor driving device 10 uses the selector 4 to sequentially input the voltage-division phase voltages VU, VV and VW by time division. In the configuration described above, since conventionally provided three comparators can be reduced to one, it is possible to realize reduction of the size of the motor driving device 10 and low cost.

Moreover, the motor driving device 10 is formed by integrating the resistors of the voltage-division phase voltage generation portion 2 and the neutral point voltage generation portion 3. In the configuration described above, since the number of components externally attached to the motor driving device 10 can be reduced, it is possible to realize reduction of the size of the electronic appliance X and low cost.

Figure 2:
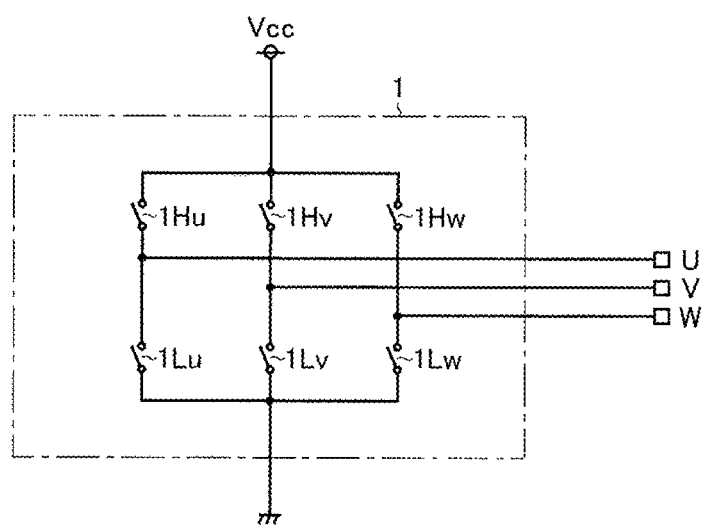
FIG. 2 A circuit diagram showing an example of the configuration (output stage) of a driver 1.

FIG. 2 is a circuit diagram showing an example of the configuration (H bridge output stage) of the driver 1. The driver 1 of the present configuration example includes: upper side switches 1Hu, 1Hv and 1Hw that individually achieve continuity/interruption between the application end of the power supply voltage Vcc and the application ends of the phase voltages U, V and W; and lower side switches 1Lu, 1Lv and 1Lw that individually achieve continuity/interruption between the application ends of the phase voltages U, V and W and a ground end. As each of the switches, a MOSFET (metal oxide semiconductor field-effect transistor) or the like can be used.

Figure 3:
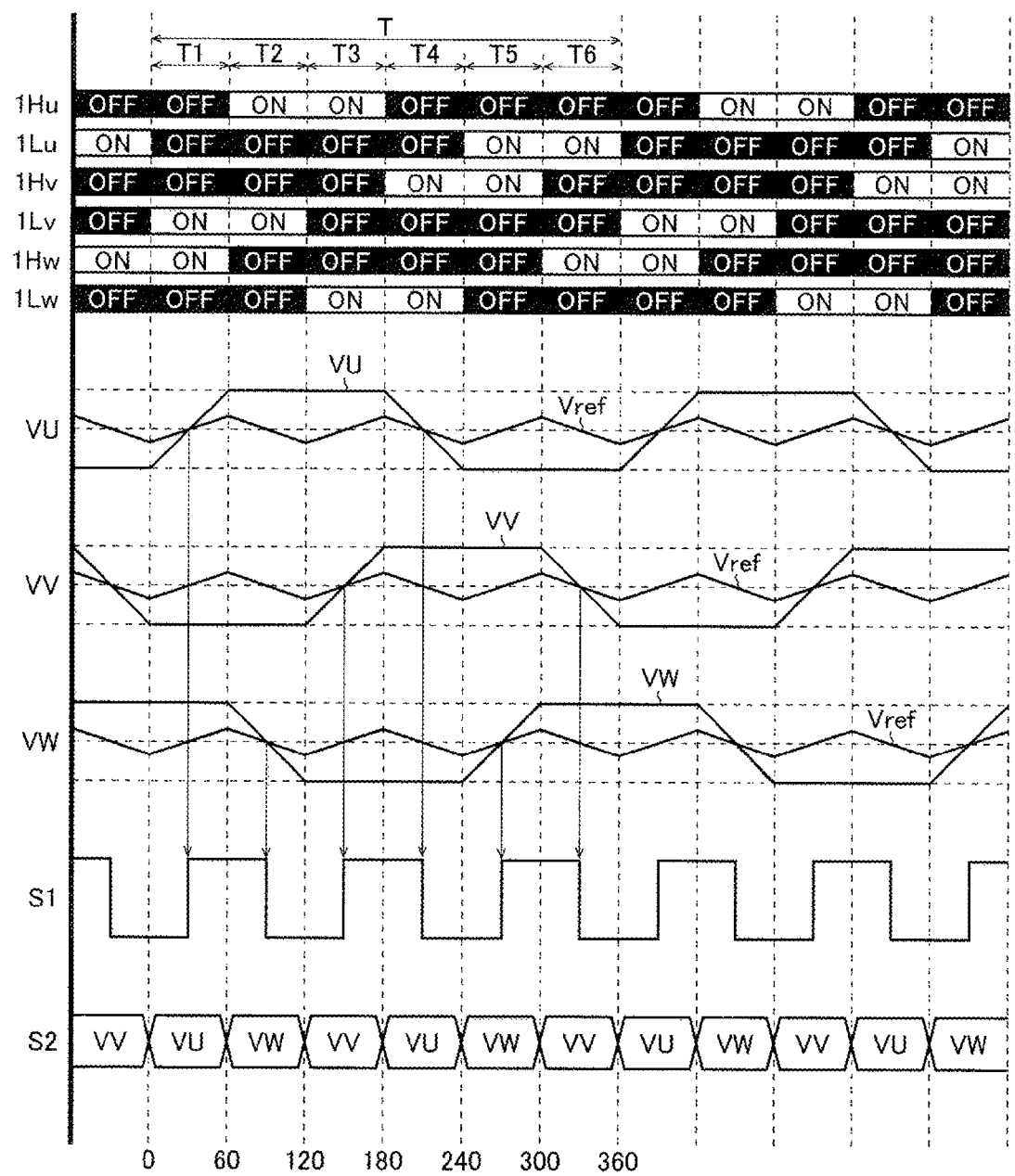
FIG. 3 A timing chart showing an example of the operation of a motor driving device 10.

FIG. 3 is a timing chart showing an example of the operation of the motor driving device 10, and shows, sequentially from above, the on/off state of the upper side switches 1Hu, 1Lv and 1Hv and the lower side switches 1Lv, 1Hw and 1Lw, the voltage-division phase voltages VH, VV and VW, the neutral point voltage Vref, the comparison signal S1 and the selection control signal S2. A description will be given in detail below by dividing one period T (having an electrical angle of 360°) into six periods T1 to T6 (each having an electrical angle of 60°).

In the period T1, in the driver 1, the upper side switch 1Hw in the W phase and the lower side switch 1Lv in the V phase are on, and the remaining switches are off. Hence, a drive current flows through the motor 20 from the W phase to the V phase. Here, the U phase terminal of the motor 20 is in a high impedance state, and a U phase back electromotive force generated in a U phase stator coil appears as the phase voltage U (hence, the voltage-division phase voltage VU). Timing at which the voltage-division phase voltage VU and the neutral point voltage Vref intersect each other corresponds to timing at which the polarity (the S pole and the N pole) of the rotor is switched in the rotational position where the U phase stator coil is provided. Hence, in order to detect the timing at which the polarity of the rotor is switched, the selector 4 selects and outputs the voltage-division phase voltage VU according to the selection control signal S2, and the comparator 5 compares the selection voltage-division phase voltage Vs (the voltage-division phase voltage VU) and the neutral point voltage Vref. In the period T1, since the voltage-division phase voltage VU is changed from a state where the voltage-division phase voltage VU is lower than the neutral point voltage Vref to a state where the voltage-division phase voltage VU is higher than the neutral point voltage Vref, the comparison signal S1 rises from low to high.

In the period T2, in the driver 1, the upper side switch 1Hu in the U phase and the lower side switch 1Lv in the V phase are on, and the remaining switches are off. Hence, the drive current flows through the motor 20 from the U phase to the V phase. Here, the W phase terminal of the motor 20 is in a high impedance state, and a W phase back electromotive force generated in a W phase stator coil appears as the phase voltage W (hence, the voltage-division phase voltage VW). Timing at which the voltage-division phase voltage VW and the neutral point voltage Vref intersect each other corresponds to timing at which the polarity (the S pole and the N pole) of the rotor is switched in the rotational position where the W phase stator coil is provided. Hence, in order to detect the timing at which the polarity of the rotor is switched, the selector 4 selects and outputs the voltage-division phase voltage VW according to the selection control signal S2, and the comparator 5 compares the selection voltage-division phase voltage Vs (the voltage-division phase voltage VW) and the neutral point voltage Vref. In the period T2, since the voltage-division phase voltage VW is changed from a state where the voltage-division phase voltage VW is higher than the neutral point voltage Vref to a state where the voltage-division phase voltage VW is lower than the neutral point voltage Vref, the comparison signal S1 falls from high to low.

In the period T3, in the driver 1, the upper side switch 1Hu in the U phase and the lower side switch 1Lw in the W phase are on, and the remaining switches are off. Hence, the drive current flows through the motor 20 from the U phase to the W phase. Here, the V phase terminal of the motor 20 is in a high impedance state, and a V phase back electromotive force generated in a V phase stator coil appears as the phase voltage V (hence, the voltage-division phase voltage VV). Timing at which the voltage-division phase voltage VV and the neutral point voltage Vref intersect each other corresponds to timing at which the polarity (the S pole and the N pole) of the rotor is switched in the rotational position where the V phase stator coil is provided. Hence, in order to detect the timing at which the polarity of the rotor is switched, the selector 4 selects and outputs the voltage-division phase voltage VV according to the selection control signal S2, and the comparator 5 compares the selection voltage-division phase voltage Vs (the voltage-division phase voltage VV) and the neutral point voltage Vref. In the period T3, since the voltage-division phase voltage VV is changed from a state where the voltage-division phase voltage VV is lower than the neutral point voltage Vref to a state where the voltage-division phase voltage VV is higher than the neutral point voltage Vref, the comparison signal S1 rises from low to high.

In the period T4, in the driver 1, the upper side switch 1Hv in the V phase and the lower side switch 1Lw in the W phase are on, and the remaining switches are off. Hence, the drive current flows through the motor 20 from the V phase to the W phase. Here, the U phase terminal of the motor 20 is in a high impedance state, and a U phase back electromotive force generated in the U phase stator coil appears as the phase voltage U (hence, the voltage-division phase voltage VU). Timing at which the voltage-division phase voltage VU and the neutral point voltage Vref intersect each other corresponds to timing at which the polarity (the S pole and the N pole) of the rotor is switched in the rotational position where the U phase stator coil is provided. Hence, in order to detect the timing at which the polarity of the rotor is switched, the selector 4 selects and outputs the voltage-division phase voltage VU according to the selection control signal S2, and the comparator 5 compares the selection voltage-division phase voltage Vs (the voltage-division phase voltage VU) and the neutral point voltage Vref. In the period T4, since the voltage-division phase voltage VU is changed from a state where the voltage-division phase voltage VU is higher than the neutral point voltage Vref to a state where the voltage-division phase voltage VV is lower than the neutral point voltage Vref, the comparison signal S1 falls from high to low.

In the period T5, in the driver 1, the upper side switch 1Hv in the V phase and the lower side switch 1Lu in the U phase are on, and the remaining switches are off. Hence, the drive current flows through the motor 20 from the V phase to the U phase. Here, the W phase terminal of the motor 20 is in a high impedance state, and the W phase back electromotive force generated in the W phase stator coil appears as the phase voltage W (hence, the voltage-division phase voltage VW). Timing at which the voltage-division phase voltage VW and the neutral point voltage Vref intersect each other corresponds to timing at which the polarity (the S pole and the N pole) of the rotor is switched in the rotational position where the W phase stator coil is provided. Hence, in order to detect the timing at which the polarity of the rotor is switched, the selector 4 selects and outputs the voltage-division phase voltage VW according to the selection control signal S2, and the comparator 5 compares the selection voltage-division phase voltage Vs (the voltage-division phase voltage VW) and the neutral point voltage Vref. In the period T5, since the voltage-division phase voltage VW is changed from a state where the voltage-division phase voltage VW is lower than the neutral point voltage Vref to a state where the voltage-division phase voltage VW is higher than the neutral point voltage Vref, the comparison signal S1 rises from low to high.

In the period T6, in the driver 1, the upper side switch 1Hw in the W phase and the lower side switch 1Lu in the U phase are on, and the remaining switches are off. Hence, the drive current flows through the motor 20 from the W phase to the U phase. Here, the V phase terminal of the motor 20 is in a high impedance state, and the V phase back electromotive force generated in the V phase stator coil appears as the phase voltage V (hence, the voltage-division phase voltage VV). Timing at which the voltage-division phase voltage VV and the neutral point voltage Vref intersect each other corresponds to timing at which the polarity (the S pole and the N pole) of the rotor is switched in the rotational position where the V phase stator coil is provided. Hence, in order to detect the timing at which the polarity of the rotor is switched, the selector 4 selects and outputs the voltage-division phase voltage VV according to the selection control signal S2, and the comparator 5 compares the selection voltage-division phase voltage Vs (the voltage-division phase voltage VV) and the neutral point voltage Vref. In the period T6, since the voltage-division phase voltage VV is changed from a state where the voltage-division phase voltage VV is higher than the neutral point voltage Vref to a state where the voltage-division phase voltage VV is lower than the neutral point voltage Vref, the comparison signal S1 falls from high to low.

Since as described above, the back electromotive force of the motor 20 sequentially appears as the phase voltage U, V or W in each of the periods T1 to T6, the pulse edge of the comparison signal S1 is monitored, and thus it is possible to detect the timing at which the polarity of the rotor is switched (hence, the rotational position of the rotor) of the rotor.

<Second Embodiment>

Figure 4:
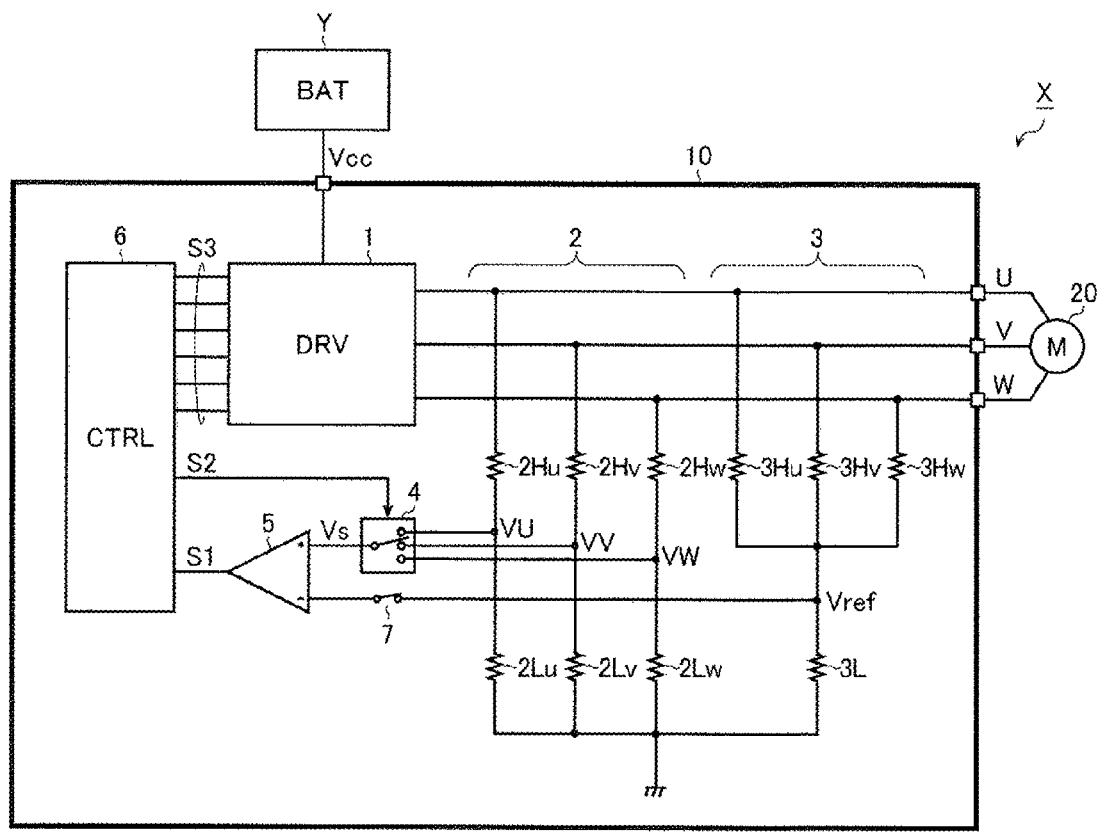
FIG. 4 A block diagram showing a second embodiment of the motor driving device.

FIG. 4 is a block diagram showing a second embodiment of the motor driving device. The motor driving device 10 of the second embodiment has substantially the same configuration as that of the first embodiment described above, and is characterized in that a dummy switch 7 which is provided between the neutral point voltage generation portion 3 and the comparator 5 and which is constantly kept on is added. The dummy switch 7 is a switch element that has the impedance characteristic and the signal delay characteristic which are the same as those of the selector 4. In the configuration described above, it is possible to more accurately detect the timing at which the voltage-division phase voltages VU, VV and VW intersect the neutral point voltage Vref.

<Third Embodiment>

Figure 5:
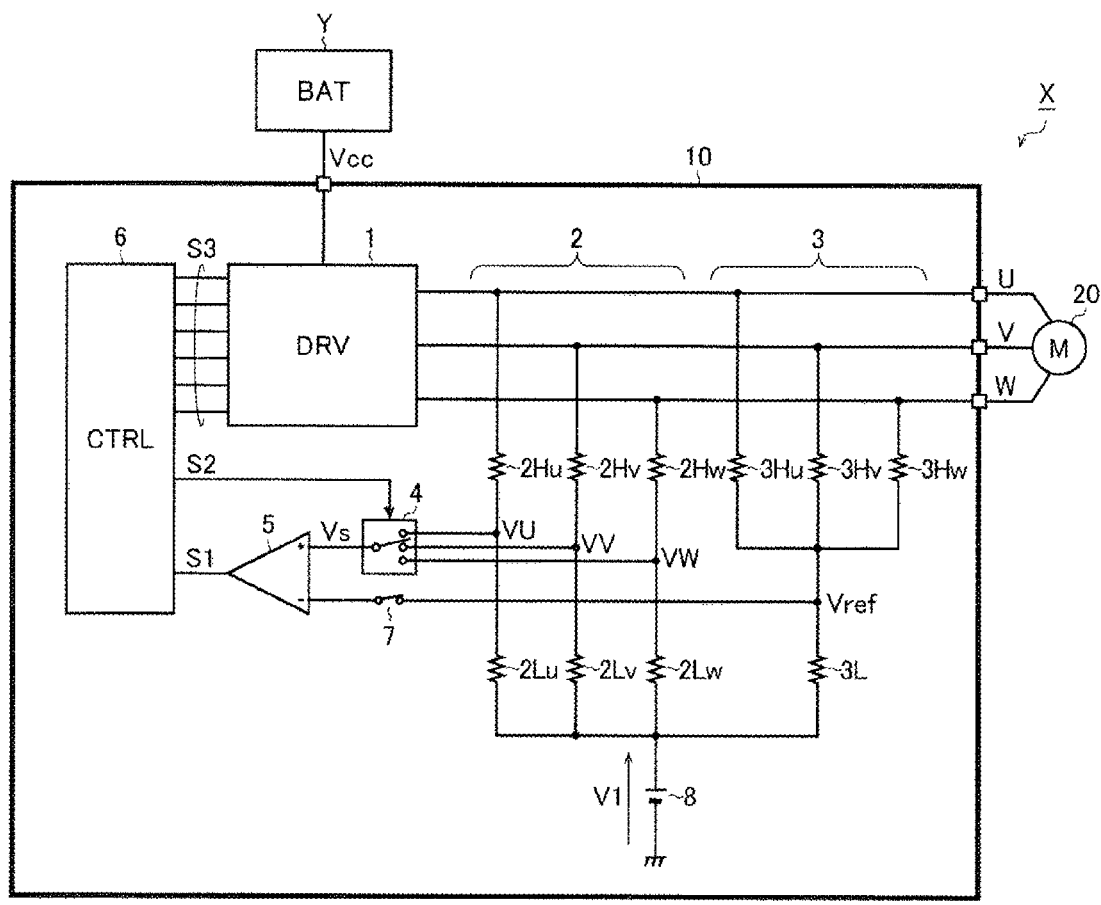
FIG. 5 A block diagram showing a third embodiment of the motor driving device.

FIG. 5 is a block diagram showing a third embodiment of the motor driving device. The motor driving device 10 of the third embodiment has substantially the same configuration as that of the second embodiment described above, and is characterized in that a bias portion 8 which applies, as a reference voltage for the voltage-division phase voltage generation portion 2 and the neutral point voltage generation portion 3, a predetermined bias voltage V1 (>GND) is added. Since as described above, the phase voltages U, V and W are divided with reference to the bias voltage V1, as compared with the configuration where the phase voltages U, V and W are divided with reference to the ground voltage GND, it is possible to reduce the decrease in detection accuracy caused by variations in the resistors.

Ideally, the polarity of the rotor is switched with timing at which the phase voltages U, V and W intersect one half of the power supply voltage Vcc. In view of the foregoing, in the bias portion 8, it is preferable to generate one half of the power supply voltage Vcc as the bias voltage V1.

Figure 6:
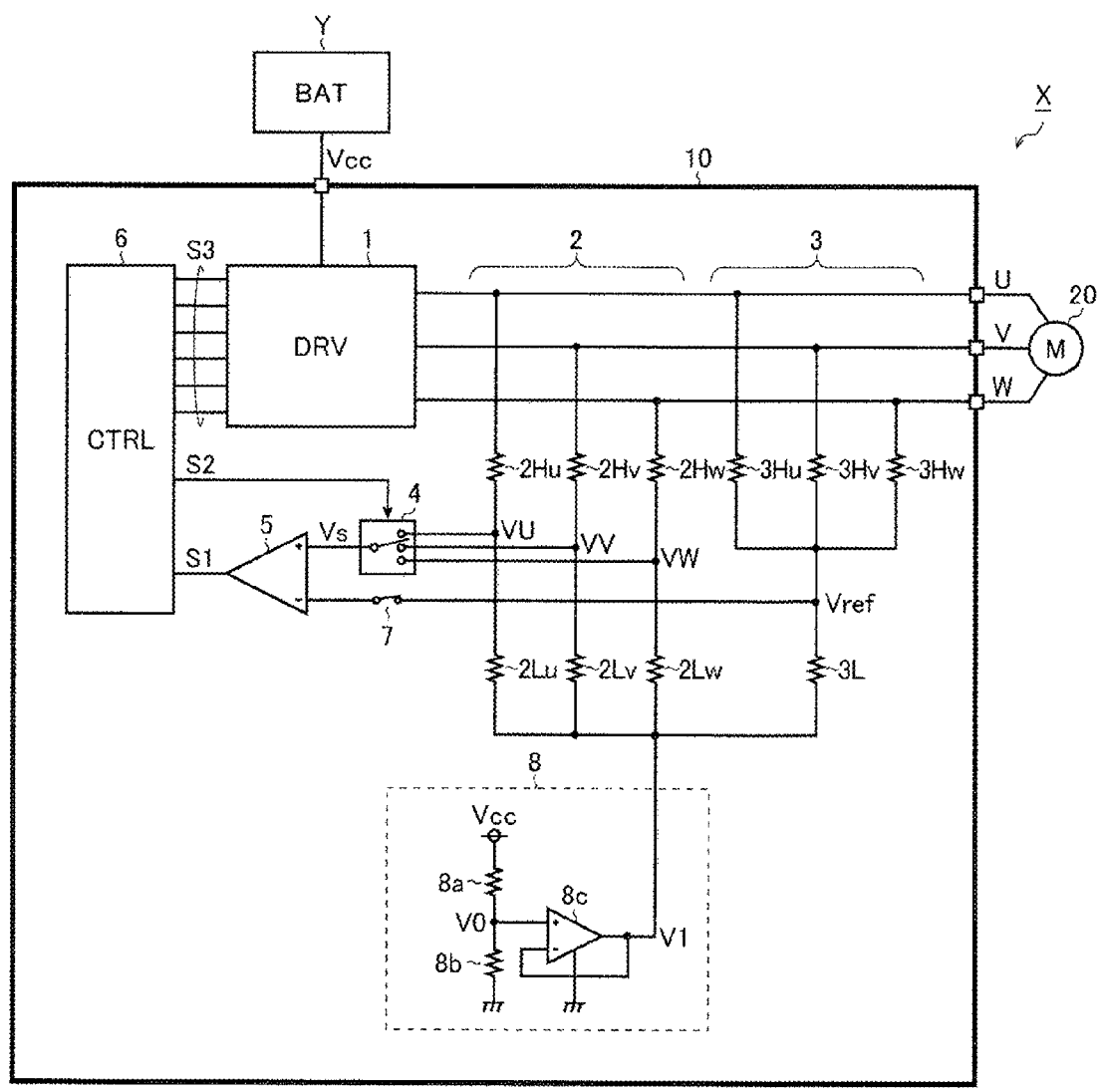
FIG. 6 A circuit diagram showing an example of the configuration of a bias portion 8.

FIG. 6 is a circuit diagram showing an example of the configuration of the bias portion 8. The bias portion 8 of the present configuration example includes resistors 8a and 8b and a buffer 8c. The resistors 8a and 8b are connected in series between the application end of the power supply voltage Vcc and the ground end, and function as a voltage-division circuit where a voltage-division power supply voltage V0 is output from the connection node therebetween. When the resistance values of the resistors 8a and 8b are equal to each other, the voltage-division power supply voltage V0 is one half of the power supply voltage Vcc. The buffer 8c outputs the voltage-division power supply voltage V0 as the bias voltage V1.

When the selector 4 is used to sequentially input the voltage-division phase voltages VU, VV and VW to the comparator 5 by time division, in a configuration in which the current path from the application end of the bias voltage V1 to the ground end has a high impedance, unintentional variations in the back electromotive force to be detected are caused by the passing of current around between the phases, with the result that it is likely to degrade the accuracy of detection of the back electromotive force.

On the other hand, since the bias portion 8 of the present configuration example can lower the impedance of the current path from the application end of the bias voltage V1 through the buffer 8c to the ground end, the passing of current around between the phases is prevented, and thus it is possible to increase the accuracy of detection of the back electromotive force.

<Application to a Vehicle>

Figure 7:
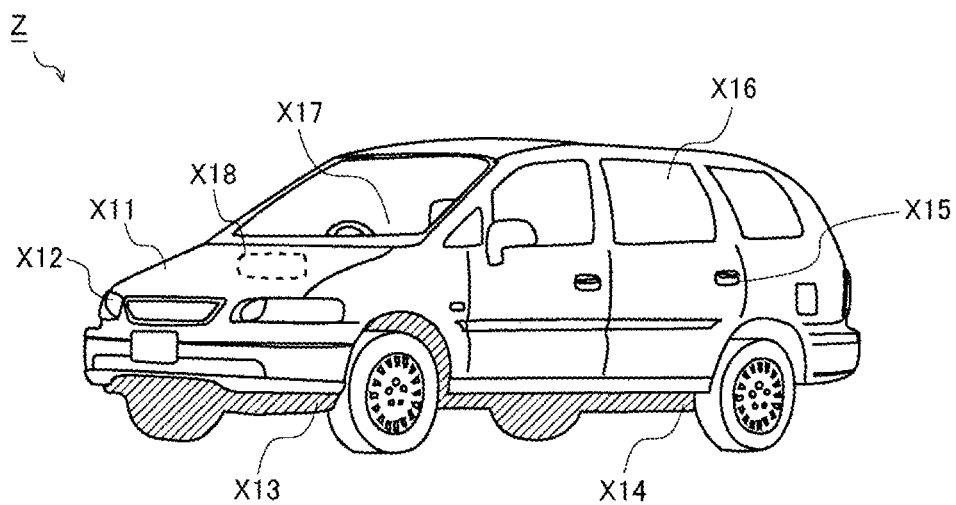
FIG. 7 An external view showing an example of the configuration of a vehicle incorporating an electronic appliance.
Figure 8:
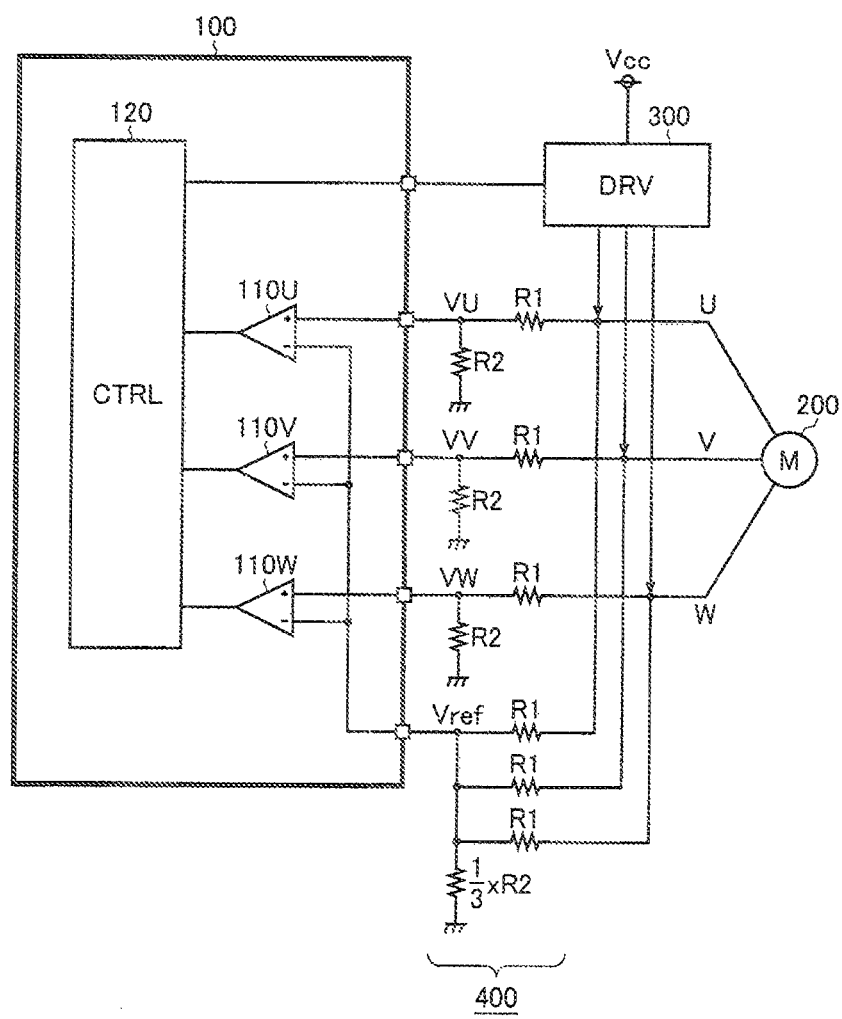
FIG. 8 A block diagram showing a conventional example of the motor driving device.

FIG. 7 is an external view showing an example of the configuration of a vehicle incorporating various electronic appliances. The vehicle Z of the present configuration example includes the battery Y (not shown in FIG. 7) and various electronic appliances X11 to X18 that operate by receiving the supply of the power supply voltage Vcc from the battery Y. For ease of illustration, the positions where the electronic appliances X11 to X18 are incorporated in FIG. 7 may be different from the actual case.

The electronic appliance X11 is an engine control unit that performs control related to the engine (such as inkjet control, electronic throttle control, idling control, oxygen sensor heater control and auto cruise control).

The electronic appliance X12 is a lamp control unit that controls the turning on and off of a HID (high intensity discharged lamp), a DRL (daytime running lamp) or the like.

The electronic appliance X13 is a transmission control unit that performs control related to a transmission.

The electronic appliance X14 is a body control unit that performs control related to the movement of the vehicle Z (such as ABS (anti-lock brake system) control, EPS (electric power steering) control and electronic suspension control).

The electronic appliance X15 is a security control unit that performs drive control on a door lock, a burglar alarm or the like.

The electronic appliances X16 are electronic appliances, such as a wiper, an electric door mirror, a power window, a dumper (shock absorber), an electric sunroof and an electric sheet, that are incorporated, at the stage of factory shipment, as standard items and maker optional items.

The electronic appliances X17 are electronic appliances, such as a vehicle-mounted A/V (audio/visual) appliance, a car navigation system and an ETC (electronic toll collection system), that are arbitrarily fitted into the vehicle Z as user optional items.

The electronic appliances X18 are electronic appliances, such as a vehicle-mounted blower, an oil pump, a water pump and a battery cooling fan (which is generally arranged under back seats), that incorporate a high-voltage resistant multiple-phase motor. The motor driving device 10 described above can incorporate these electronic appliances X18.

<Other Variations>

Although in the embodiments described above, the example where the present invention is applied to the vehicle-mounted motor driver IC has been described, the present invention is not limited to this application. The present invention can be widely applied to motor driving devices that have the function of detecting the rotational position of a rotor without use of a sensor.

As described above, in addition to the embodiments described above, various modifications can be made to various technical features disclosed in the present specification without departing from the spirit of its technical creation. In other words, it should be considered that the embodiments described above are illustrative in all respects, and not restrictive; it should be understood that the technical scope of the present invention is indicated not by the description of the embodiments described above but by the scope of claims and that meanings equivalent to the scope of claims and all modifications belonging to the scope are included.

INDUSTRIAL APPLICABILITY

The present invention is a technology that can be utilized for, for example, a motor driving device which is incorporated in a vehicle-mounted electronic appliance to perform drive control on a motor.

LIST OF REFERENCE NUMERALS 1 driver
1Hu, 1Hv, 1Hw upper side switch
1Lu, 1Lv, 1Lw lower side switch
2 voltage-division phase voltage generation portion
2Hu, 2Hv, 2Hw first resistor
2Lu, 2Lv, 2Lw second resistor
3 neutral point voltage generation portion
3Hu, 3Hv, 3Hw third resistor
3L third resistor
4 selector
5 comparator
6 controller
7 dummy switch
8 bias portion
8a, 8b resistor (voltage-division circuit)

8c buffer
10 motor driving device
20 three-phase brushless motor
X, X11 to X18 electronic appliance
Y battery
Z vehicle

What is claimed is:

1. A motor driving device comprising:
a driver that receives supply of a power supply voltage to apply a plurality of phase voltages to a motor;
a voltage-division phase voltage generation portion that divides each of the phase voltages to generate a plurality of voltage-division phase voltages;
a neutral point voltage generation portion that combines and divides the phase voltages to generate a neutral point voltage;
a selector that selectively outputs one of the voltage-division phase voltages as a selection voltage-division phase voltage;
a comparator that compares the selection voltage-division phase voltage and the neutral point voltage to generate a comparison signal;
a controller that generates a selection control signal of the selector and an energization control signal of the driver according to the comparison signal; and
a bias portion that applies a bias voltage, which is predetermined, as a reference voltage of the voltage-division phase voltage generation portion and the neutral point voltage generation portion,
wherein the bias voltage is one half of the power supply voltage,
wherein the voltage-division phase voltage generation portion includes:
a plurality of first resistors whose first ends are respectively connected to application ends of the phase voltages and whose second ends are respectively connected to application ends of the voltage-division phase voltages; and
a plurality of second resistors whose first ends are respectively connected to the application ends of the voltage-division phase voltages and whose second ends are connected together to an application end of the reference voltage, wherein the neutral point voltage generation portion includes:
a plurality of third resistors whose first ends are respectively connected to the application ends of the phase voltages and whose second ends are connected together to an application end of the neutral point voltage; and
a fourth resistor whose first end is connected to the application end of the neutral point voltage and whose second end is connected to an application end of the reference voltage, and
wherein the bias voltage equals the voltage of the selection voltage-division phase voltage and the neutral point voltage when the voltage of the selection voltage-division phase voltage equals the neutral point voltage.

2. The motor driving device of claim 1, further comprising:
a dummy switch that is provided between the neutral point voltage generation portion and the comparator and that is constantly kept on.

3. An electronic appliance comprising:
a motor; and
the motor driving device of claim 1 that performs drive control on the motor.

4. The motor driving device of claim 1, wherein the first to fourth resistors are integrated into a semiconductor device.

5. A vehicle comprising:
a battery; and
the electronic appliance of claim 3 that operates by receiving the supply of the power supply voltage from the battery.

6. A motor driving device comprising:
a driver that receives supply of a power supply voltage to apply a plurality of phase voltages to a motor;
a voltage-division phase voltage generation portion that divides each of the phase voltages to generate a plurality of voltage-division phase voltages;
a neutral point voltage generation portion that combines and divides the phase voltages to generate a neutral point voltage;
a selector that selectively outputs one of the voltage-division phase voltages as a selection voltage-division phase voltage, no other one of the voltage-division phase voltages being output simultaneously with the selected one of the voltage-division phase voltages;
a comparator that compares the selection voltage-division phase voltage and the neutral point voltage to generate a comparison signal;
a controller that generates a selection control signal of the selector and an energization control signal of the driver according to the comparison signal;
a bias portion that applies a bias voltage, which is predetermined, as a reference voltage of the voltage-division phase voltage generation portion and the neutral point voltage generation portion;
wherein the bias portion includes:
a voltage-division circuit that divides the power supply voltage to generate a voltage-division power supply voltage; and
a buffer that outputs the voltage-division power supply voltage as the bias voltage,
wherein the bias voltage is one half of the power supply voltage,
wherein the voltage-division phase voltage generation portion includes: a plurality of first resistors whose first ends are respectively connected to application ends of the phase voltages and whose second ends are respectively connected to application ends of the voltage-division phase voltages; and a plurality of second resistors whose first ends are respectively connected to the application ends of the voltage-division phase voltages and whose second ends are connected together to an application end of the reference voltage, and
the neutral point voltage generation portion includes: a plurality of third resistors whose first ends are respectively connected to the application ends of the phase voltages and whose second ends are connected together to an application end of the neutral point voltage; and a fourth resistor whose first end is connected to the application end of the neutral point voltage and whose second end is connected to an application end of the reference voltage, and
wherein the bias voltage equals the voltage of the selection voltage-division phase voltage and the neutral point voltage when the voltage of the selection voltage-division phase voltage equals the neutral point voltage.

7. The motor driving device of claim 6, wherein the first to fourth resistors are integrated into a semiconductor device.

8. A motor driving device comprising:
a driver that receives supply of a power supply voltage to apply a plurality of phase voltages to a motor;
a voltage-division phase voltage generation portion that divides each of the phase voltages to generate a plurality of voltage-division phase voltages;
a neutral point voltage generation portion that combines and divides the phase voltages to generate a neutral point voltage;
a comparator that compares one of the voltage-division phase voltages and the neutral point voltage to generate a comparison signal;
a controller that generates an energization control signal of the driver according to the comparison signal; and
a bias portion that applies a bias voltage which is predetermined as a reference voltage of the voltage-division phase voltage generation portion and the neutral point voltage generation portion, the bias voltage being above a ground to reduce inaccuracy of the voltage-division phase voltage,
wherein the bias voltage is one half of the power supply voltage,
wherein the voltage-division phase voltage generation portion includes: a plurality of first resistors whose first ends are respectively connected to application ends of the phase voltages and whose second ends are respectively connected to application ends of the voltage-division phase voltages; and a plurality of second resistors whose first ends are respectively connected to the application ends of the voltage-division phase voltages and whose second ends are connected together to an application end of the reference voltage,
wherein the neutral point voltage generation portion includes: a plurality of third resistors whose first ends are respectively connected to the application ends of the phase voltages and whose second ends are connected together to an application end of the neutral point voltage; and a fourth resistor whose first end is connected to the application end of the neutral point voltage and whose second end is connected to an application end of the reference voltage, and
wherein the bias voltage equals the voltage of the selection voltage-division phase voltage and the neutral point voltage when the voltage of the selection voltage-division phase voltage equals the neutral point voltage.

9. A motor driving device comprising:
a driver that receives supply of a power supply voltage to apply a plurality of phase voltages to a motor;
a voltage-division phase voltage generation portion that divides each of the phase voltages to generate a plurality of voltage-division phase voltages;
a neutral point voltage generation portion that combines and divides the phase voltages to generate a neutral point voltage;
a comparator that compares one of the voltage-division phase voltages and the neutral point voltage to generate a comparison signal;
a controller that generates an energization control signal of the driver according to the comparison signal; and
a bias portion that applies a bias voltage which is predetermined as a reference voltage of the voltage-division phase voltage generation portion and the neutral point voltage generation portion, the bias voltage being above a ground voltage to reduce inaccuracy of the voltage-division phase voltage,
wherein the bias voltage equals the voltage of the selection voltage-division phase voltage and the neutral point voltage when the voltage of the selection voltage-division phase voltage equals the neutral point voltage.

10. The motor driving device of claim 9, wherein the bias voltage is one half of the power supply voltage.

11. The motor driving device of claim 10,
wherein the voltage-division phase voltage generation portion includes: a plurality of first resistors whose first ends are respectively connected to application ends of the phase voltages and whose second ends are respectively connected to application ends of the voltage-division phase voltages; and a plurality of second resistors whose first ends are respectively connected to the application ends of the voltage-division phase voltages and whose second ends are connected together to an application end of the reference voltage, and
wherein the neutral point voltage generation portion includes: a plurality of third resistors whose first ends are respectively connected to the application ends of the phase voltages and whose second ends are connected together to an application end of the neutral point voltage; and a fourth resistor whose first end is connected to the application end of the neutral point voltage and whose second end is connected to an application end of the reference voltage.

12. The motor driving device of claim 11, wherein the bias portion includes:
a voltage-division circuit that divides the power supply voltage to generate a voltage-division power supply voltage; and
a buffer that outputs the voltage-division power supply voltage as the bias voltage.

* * * * *